Jan. 7, 1936.  H. F. MAYNES  2,027,306
REEL STRUCTURE
Filed June 6, 1935  2 Sheets-Sheet 1
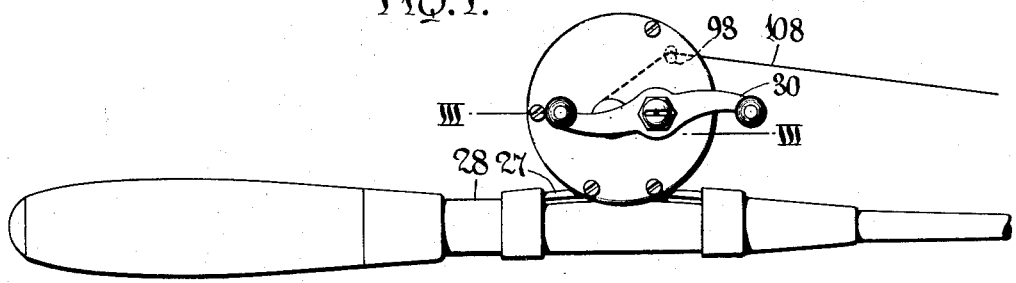
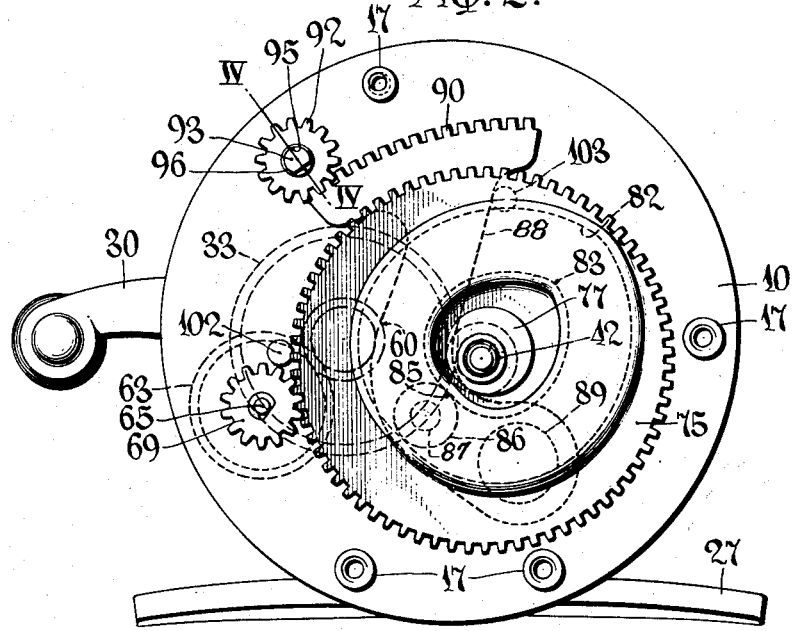
INVENTOR
Hyla Frederick Maynes,
BY
Beau, Brooks, Buckley & Beau.
ATTORNEYS Jan. 7, 1936.  H. F. MAYNES  2,027,306
REEL STRUCTURE
Filed June 6, 1935 2 Sheets-Sheet 2
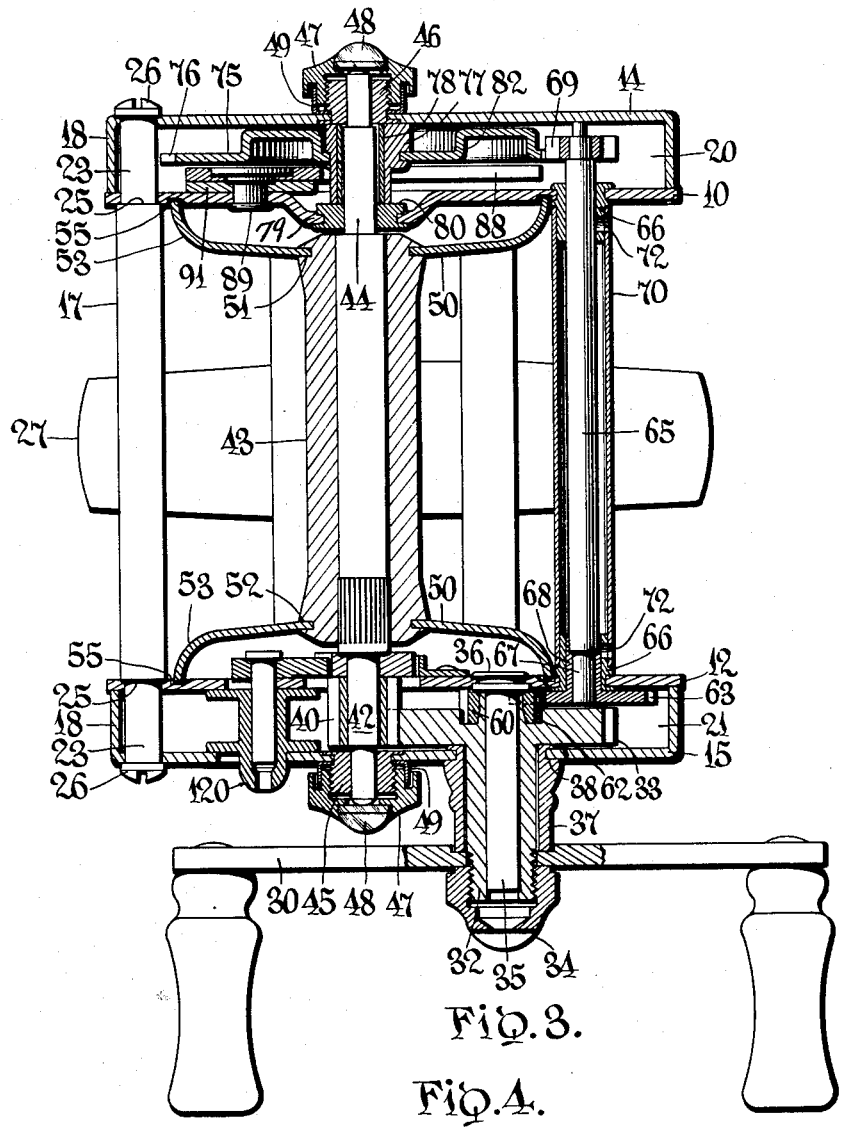
Fig. 3.
Fig. 4.
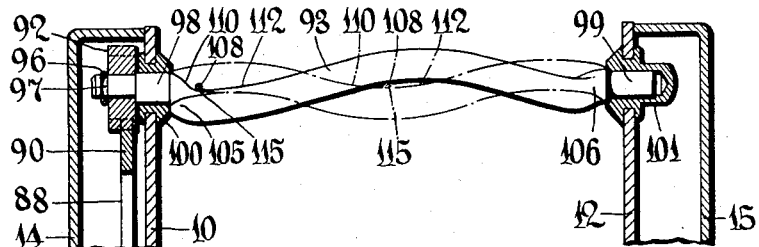
INVENTOR
Hyla Frederick Maynes,
BY
Beau, Brooks, Buckley & Beau.
ATTORNEYS Patented Jan. 7, 1936

2,027,306

UNITED STATES PATENT OFFICE 2,027,306

REEL STRUCTURE

Hyla Frederick Maynes, North Tonawanda, N. Y., assignor of one-half to Emma C. Maynes, North Tonawanda, N. Y.

Application June 6, 1935, Serial No. 25,275

8 Claims. (Cl. 242—84.4)

This invention relates to fishing reels and it has particular relation to mechanism for operating the spool and level wind members of a fishing reel, together with improved structure of a level wind shaft.

One object of the invention is to provide an improved assembly of operating mechanism for reel spools and level wind members of a fishing reel.

Another object of the invention is to provide an improved and simplified structure and assembly of spool driving elements and level wind elements, all of which can be disassembled, and certain parts of which are constructed as a unit in such manner as to insure automatically correct timed relation of operating elements upon reassembling them.

Another object of the invention is to provide an improved and simplified form of level wind or line guiding elements.

The invention involves improvements over the type of reel disclosed in my Patent No. 1,973,686, dated September 11, 1934, wherein there is described an improved level wind mechanism including a line directing element in the form of a spiral shaft which is cut approximately half way through its overall thickness in effecting its spiral form, and the spiral extends slightly less than one complete circumferential turn over the distance corresponding substantially to the length of the spool of the reel.

The spiral shaft is rotated alternately through predetermined degrees of angular movement to provide oscillating motion of the shaft for shifting the fishing line from one end of the spool to the other as the latter is rotated. The shaft oscillates or rotates slowly relative to the speed of the reel crank and spool, and hence considerable gear reduction is included to provide the desired rate of oscillation of the spiral shaft, as well as lessening the force required to operate such spiral shaft.

One of the features of this invention includes an improved structure of gearing for transmitting power from the manually operated crank to the reel spool and to the level wind mechanism, as well as an improved structure of the spiral level wind shaft.

Referring to the drawings:

Fig. 1 is an end elevation of a fishing reel as it appears mounted upon a handle portion of a rod;

Fig. 2 is an end elevation, on a larger scale, of the fishing reel having an end casing member removed to reveal the operating parts of the reel;

Fig. 3 is an irregular section, on a larger scale, taken substantially along the line III—III of Fig. 1; and Fig. 4 is a fragmentary section, on a larger scale, taken substantially along the line IV—IV of Fig. 2, and illustrating the form of level wind shaft included in the invention.

In practicing the invention a pair of parallel annular heads or end plates 10 and 12 are assembled with cup shaped end casings 14 and 15, respectively, by means of spacing bars 17 disposed through both the plates and the casings adjacent their marginal portions. Inwardly turned flanges 18 of the casings abut the plates 10 and 12 to provide substantially closed chambers or housings 20 and 21.

End portions 23 of the spacing bars are reduced in diameter to provide shoulders or abutments 25 for positioning the opposed plates 10 and 12. Suitable fastening elements 26, such as screws, are threaded axially into the reduced ends 23 of the bars 17 to secure the end plates, casings and bars in rigidly assembled relation.

A pair of adjacent bars 17 are rigidly secured to a saddle 27 adapted to be mounted upon a fishing rod 28 for the purpose of supporting the reel in a conventional manner for operating it. A double crank 30 is rigidly secured to the outer end of a sleeve 32 that is formed integrally or rigidly as an axial extension of a driving gear 33, and together with the gear, is rotatably mounted upon a bearing stud 35. A head 36 formed on the end of the stud is rigidly carried in the end plate 12 and a cap 34 screwed upon the outer end of the sleeve 32 maintains the crank in its proper position.

A cylindrical shield or spacer 37 loosely surrounds the sleeve 32 and is rigidly mounted, as indicated at 38, coaxially thereof in the wall of the casing 15.

A relatively smaller gear 40 engages the gear 33 and is rigidly secured upon a reduced end portion 42 of a spool shaft 43 that has one end rotatable in a bearing support 45 provided rigidly in the wall of the casing 15. The other end portion 44 of this spool shaft is rotatable in a bearing 46 carried rigidly in the outer wall of the casing 14. The outer end of the bearings 45 and 46 have caps 47 threaded thereon, and bearing elements 48 in the caps can be forced against the ends of the shaft to impose a braking action thereon. Ordinarily the spool shaft rotates freely. Suitable cupped shields 49 cooperate with the caps in housing the bearing 45 and 46.

A pair of cupped discs 50 are secured axially and rigidly upon the spool shaft 43, as indicated at 51 and 52, adjacent the plates 10 and 12, respectively, and their outer edges 53 are turned outwardly in opposite directions toward grooved portions 55 of the plates in such maner as to be substantially flush therewith throughout their circumferential edges, and without interfering with relative rotation between the discs and plates.

An annular gear 60 is rigidly secured axially of the inner end of the sleeve 32 in a recessed portion 62 thereof and in slightly offset relation to the gear 33, in such manner that it abuts the inner headed end 36 of the stud shaft 25. This gear 60 meshes with a slightly larger gear 63 which is carried rigidly upon one end of a shaft 65 reaching from one end plate 10 to the other end plate 12. Bearing sleeves 66 rigidly mounted in the end plates rotatably support the shaft 65. A reduced end portion 67 of the shaft rigidly receives a bearing extension 68 of the gear 63. Another relatively smaller gear 69 is rigidly secured to the end portion of the shaft 65 opposite the gear 63 and inside the chamber 20. A tubular housing 70 having opposite end portions rotatably carried by the bearing sleeves 66 protects the shaft 65, and openings 72 registering through the tube and sleeves provide for access to the bearing portions of the shaft to lubricate the latter. The tube 70 can be turned manually to register the openings and then turned sufficiently to close them after the bearings have been lubricated.

A cam disc or gear 75 is provided with circumferential gear teeth 76 meshing with the gear 69, and has an eccentric hub sleeve 77 rotatably carried upon a bearing sleeve 78 that is rigidly secured in an offset wall portion 79 of the end plate 10. One end of the hub sleeve 77 abuts the wall of the casing 14 and its other end abuts a shoulder 80 formed rigidly upon one end of the bearing sleeve 78. The body portion of the cam disc 75 is stamped to provide a cam channel 82 of substantially heart shape having a high point 83 and a low point 85. A roller 86 disposed in the channel is journalled upon a stud 87 that is rigidly carried upon an intermediate portion of a gear arm 88 for oscillating the latter. One end of the gear arm is provided with a pin 89 that is mounted in the wall of the end plate 10, and the other end of the gear arm is provided with an integral gear segment 90 which engages a pinion 92 mounted rigidly upon one end of a level wind rotatable shaft 93. A washer or disc 91 is disposed about the pin 89 and spaces the arm 88 from the plate 10.

It will be observed that the end of the level wind shaft is substantially D-shaped in cross section and fits into an opening 95 of the same shape in the pinion. A resilient split ring (Fig. 4) 96 fitted into a groove 97 formed adjacent the shaft end prevents the pinion 92 from being displaced from the end of the shaft. Opposite end bearing portions 98 and 99 of the level wind shaft are journalled in bearing sleeves 100 and 101 carried rigidly in the plates 10 and 12, respectively.

The segment 90 is prevented from becoming disengaged from the pinion 92 when the casing 18 is removed, by means of stops 102 and 103 which are mounted rigidly upon the end plate 10 at the limits of movement of the arm 88. In disassembling the end casings, the segment 90 and pinion 92 remain mounted upon the end plate 10 in the same relation. The reel is ordinarily disassembled in order that it can be cleaned properly, but in this disassembling of parts, the gear segment 90 remains meshed with the pinion, which, in turn, remains rigidly mounted upon the shaft 93, although the shaft end opposite the pinion can be slipped from the bearing sleeve 101 upon moving the end plates 10 and 12 farther apart. Thus essential disassembling is accomplished without disturbing the timed relation between the gear segment and the pinion.

The body of the spiral shaft 93 is composed of suitable material, such as wire, which is bent into the desired spiral form. Adjacent its bearing portions 98 and 99, the spiral shaft has offset or angular sections 105 and 106 at which the spiralling of the shaft commences, and the spiral configuration extends slightly less than one complete circumferential turn while extending longitudinally substantially the distance between the bearing portions 98 and 99. The ratio between the gear segment 90 and the pinion 92 is such that the oscillation of the gear segment in either direction causes slightly less than one complete revolution of a level wind shaft 93.

When the crank 30 is rotated in one direction the gears 33 and 34 rotate the spool in such direction as to reel in and wind the fishing line 108 thereon. At the same time, the train of gears 60, 63, 69 and 75 are also rotated by the crank, and the cam roller 86 travels about the cam channel 82 to oscillate the segmental gear 90. When the cam gear 75 is rotated in either direction the roller 86 travels uniformly and continuously from the low point 85 to the high point 83, and vice versa, of the cam channel to move the gear segment 90 in predetermined cycles and oscillation. The cam channel and gear are so proportioned that movement from the high point to the low point, or from the low point to the high point, causes slightly less than one complete revolution of the pinion 90, and consequently, of the spiral level wind shaft 93.

Since the spiral configuration of the shaft 93 traverses slightly less than one complete circumferential turn of the shaft, and the shaft, in each cycle of oscillation, turns slightly less than one complete revolution, the fishing line 108 lying upon the spiral will be shifted by the latter laterally from side to side, or, in other words, from end to end of the spool, in response to the oscillatory movement of the pinion 92. The spiral surface of the shaft, which is substantially uniformly circular in cross-section, in fact, provides a cam-like action upon the line 108 in shifting it. The offset portions 105 and 106 at the end portions of the shaft automatically reverse the shifting action upon the line adjacent the ends of the shaft upon reversal of the rotative motion of the shaft in its oscillation.

Referring particularly to Fig. 4 of the drawings it will be observed that the line 108 contacts the spiral surface at a location slightly below the axis of rotation joining the bearing portions 98 and 99 of the spiral shaft and this relationship continues as the position of the line is altered by the turning of the shaft by which the point of contact varies from end to end of the shaft. This action occurs regardless of the direction of rotation of the spiral shaft until the line reaches either of the reversing offset portions 105 or 106. Thus, it may be considered that, in any position of the spiral shaft between its limits of oscillation, converging guide portions 110 and 112 are presented to the line, the latter of which always, under normal conditions, lies in the bottom or apex 115 of these guide portions. In other words, a shifting valley-like track for the line is formed by the spiral and the line always tends to remain at the shifting apex or bottom of the track which is shown in this example of the invention to be slightly below the axis of the bearing portions 98 and 99 of the shaft. If the line 108 is played out very rapidly from the reel spool, such line can whip laterally from side to side without interference from the spiral. Then upon resuming the reeling in action, or in playing out the line less rapidly, the latter will automatically seek the shifting valley-like apex 115 and again perfect level winding can be continued.

A clicker mechanism 120 of the type described in my patent mentioned above is installed in the construction and operates in a conventional manner. From the foregoing description, it will be apparent that the invention involves a structure in which the level wind spiral shaft operates efficiently without imposing an appreciable drag upon the reel gear and which is extremely simple and positive in its operation. The spiral reversible shaft is geared down greatly from the crank revolution of the reel, and hence, does not interfere with the line when it is played out very rapidly incidental to casting. Thus the structure tends to increase the casting distance over the conventional type of reels and facilitates the reeling operation.

Although only one form of the invention has been shown and described in detail, it will be apparent to those skilled in the art that the invention is not so limited but that various changes may be made therein without departing from the spirit of the invention or from the scope of the appended claims.

I claim:

1. In a fishing reel, a driving crank for winding a fishing line upon the reel, a level wind shaft having a driving connection to the crank, opposite end portions of the shaft having bearing portions, means for supporting the bearing portions of the shaft, portions of the shaft adjacent the bearing portions being offset from the axes of said bearing portions, and the portion of the shaft between the offset portions being in spiral form.

2. In a fishing reel having means for winding a fishing line thereon, a level wind shaft for guiding the fishing line alternately from end to end of the reel, said shaft having axially aligned bearing portions, the shaft being in the form of a spirally shaped wire between the bearing portions.

3. In a fishing reel having means for winding a fishing line thereon, a level wind shaft for guiding the fishing line alternately from end to end of the reel, a level wind shaft of substantially circular cross section having bearing portions adjacent its opposite ends, means for driving the shaft, a portion of the shaft adjacent each bearing portion being disposed at an angle to the latter, the portion of the shaft joining the angular portions being bent to form a spiral.

4. In a fishing reel having means for winding a fishing line thereon, a level wind spiral shaft in the form of a spirally bent wire for guiding the fishing line alternately from end to end of the reel, the spiral wire shaft presenting a shifting valley-like contour substantially laterally to the fishing line to prevent said line from being displaced laterally from either side of the valley-like contour.

5. In a fishing reel having means for winding a fishing line thereon, a level wind shaft in wire form for guiding the fishing line alternately from end to end of the reel, said shaft having axial bearing portions, means for rotatably supporting the shaft at the bearing portions, said shaft having portions extending at an angle inwardly of the bearing portions, the portion of the shaft between the angular portions being in spiral form and presenting a shifting valley-like contour to the fishing line to be guided as the shaft is rotated through predetermined angles, the bottom of the valley-like contour in its various positions being disposed below the axis joining the bearing portions of the shaft.

6. A fishing reel comprising a frame structure, a line winding spool having opposite end portions journalled in opposite end portions of the frame structure, a crank member having a pair of driving gears connected thereto and rotatably carried in one end portion of the frame structure, a shaft spaced from the spool and having a gear mounted on each opposite end portion thereof in opposite end portions of said structure, one of the driving gears having a driving connection to the spool, the other driving gear engaging a gear at one end of said shaft, a cam disc rotatably mounted in the end of the structure opposite the driving gears and having gear teeth engaging the gear at the other end of said shaft, an oscillatable arm mounted in the frame structure and having a camming connection to the cam disc for oscillating it, a level wind mechanism including an oscillatable shaft, and a driving connection between said level wind mechanism and said oscillatable arm.

7. A fishing reel comprising a line winding spool, disc members supporting the spool at opposite end portions thereof, a crank having a driving connection to the spool, a shaft extending substantially from end to end of the reel and having bearing supports in the disc members, a gear mounted on each end of said shaft, a driving connection between the crank and one of said gears, a level wind mechanism for guiding a fishing line from end to end of the spool as the latter is rotated, a driving connection between said level wind mechanism and the other gear on said shaft, and a sleeve encasing the shaft and rotatably supported in the casings, said sleeve and bearing supports having openings for registering in predetermined relative positions of the sleeve and bearing supports to facilitate lubricating the bearings of the shaft.

8. A fishing reel comprising a line winding spool, frame structure rotatably supporting opposite end portions of the spool, a shaft spaced from the spool and having opposite end portions thereof journaled in the frame structure, an oscillatable level wind mechanism having a drive connection with one end portion of said shaft and operable to shift a fishing line from end to end of the spool as the latter is rotated, and a winding crank having a driving connection with the other end of said shaft and having a driving connection with the spool.

HYLA FREDERICK MAYNES.